United States Patent
Blumrich et al.

(10) Patent No.: US 8,756,350 B2
(45) Date of Patent: Jun. 17, 2014

(54) METHOD AND APPARATUS FOR EFFICIENTLY TRACKING QUEUE ENTRIES RELATIVE TO A TIMESTAMP

(75) Inventors: Matthias A. Blumrich, Ridgefield, CT (US); Dong Chen, Croton On Hudson, NY (US); Alan G. Gara, Mount Kisco, NY (US); Mark E. Giampapa, Irvington, NY (US); Philip Heidelberger, Cortlandt Manor, NY (US); Martin Ohmacht, Yorktown Heights, NY (US); Valentina Salapura, Chappaqua, NY (US); Pavlos Vranas, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 1523 days.

(21) Appl. No.: 11/768,800

(22) Filed: Jun. 26, 2007

(65) Prior Publication Data
US 2009/0006672 A1   Jan. 1, 2009

(51) Int. Cl.
   *G06F 3/00*   (2006.01)
   *G06F 5/00*   (2006.01)

(52) U.S. Cl.
   USPC ............................................. 710/52; 710/54

(58) Field of Classification Search
   None
   See application file for complete search history.

(56) References Cited

U.S. PATENT DOCUMENTS

| | | |
|---|---|---|
| 4,777,595 A | 10/1988 | Strecker et al. |
| 5,063,562 A | 11/1991 | Barzilai et al. |
| 5,142,422 A | 8/1992 | Zook et al. |
| 5,349,587 A | 9/1994 | Nadeau-Dostie et al. |
| 5,353,412 A | 10/1994 | Douglas et al. |
| 5,452,432 A | 9/1995 | Macachor |
| 5,524,220 A | 6/1996 | Verma et al. |
| 5,634,007 A | 5/1997 | Calta et al. |
| 5,659,710 A | 8/1997 | Sherman et al. |
| 5,708,779 A | 1/1998 | Graziano et al. |
| 5,748,613 A | 5/1998 | Kilk et al. |
| 5,761,464 A | 6/1998 | Hopkins |
| 5,796,735 A | 8/1998 | Miller et al. |

(Continued)

OTHER PUBLICATIONS

Definition of "mechanism", Oxford English Dictionary, http://dictionary.oed.com/cgi/entry/00304337?query_type=word&queryword=mechanism&first=1&max_to_show=10&sort_type=alpha&result_place=2&search_id=y2at-u2EIGc-11603&hilite=00304337.*

(Continued)

*Primary Examiner* — Kris Rhu
(74) *Attorney, Agent, or Firm* — Scully, Scott, Murphy & Presser, P.C.; Daniel P. Morris, Esq.

(57) ABSTRACT

An apparatus and method for tracking coherence event signals transmitted in a multiprocessor system. The apparatus comprises a coherence logic unit, each unit having a plurality of queue structures with each queue structure associated with a respective sender of event signals transmitted in the system. A timing circuit associated with a queue structure controls enqueuing and dequeuing of received coherence event signals, and, a counter tracks a number of coherence event signals remaining enqueued in the queue structure and dequeued since receipt of a timestamp signal. A counter mechanism generates an output signal indicating that all of the coherence event signals present in the queue structure at the time of receipt of the timestamp signal have been dequeued. In one embodiment, the timestamp signal is asserted at the start of a memory synchronization operation and, the output signal indicates that all coherence events present when the timestamp signal was asserted have completed. This signal can then be used as part of the completion condition for the memory synchronization operation.

21 Claims, 5 Drawing Sheets

(56) References Cited

U.S. PATENT DOCUMENTS

| | | | |
|---|---|---|---|
| 5,809,278 | A | 9/1998 | Watanabe et al. |
| 5,825,748 | A | 10/1998 | Barleu et al. |
| 5,890,211 | A | 3/1999 | Sokolov et al. |
| 5,917,828 | A | 6/1999 | Thompson |
| 6,023,732 | A | 2/2000 | Moh et al. |
| 6,061,511 | A | 5/2000 | Marantz et al. |
| 6,072,781 | A | 6/2000 | Feeney et al. |
| 6,122,715 | A | 9/2000 | Palanca et al. |
| 6,185,214 | B1 | 2/2001 | Schwartz et al. |
| 6,219,300 | B1 | 4/2001 | Tamaki |
| 6,263,397 | B1 | 7/2001 | Wu et al. |
| 6,295,571 | B1 | 9/2001 | Scardamalia et al. |
| 6,311,249 | B1 | 10/2001 | Min et al. |
| 6,324,495 | B1 | 11/2001 | Steinman |
| 6,356,106 | B1 | 3/2002 | Greeff et al. |
| 6,366,984 | B1 | 4/2002 | Carmean et al. |
| 6,442,162 | B1 | 8/2002 | O'Neill et al. |
| 6,466,227 | B1 | 10/2002 | Pfister et al. |
| 6,564,331 | B1 | 5/2003 | Joshi |
| 6,594,234 | B1 | 7/2003 | Chard et al. |
| 6,598,123 | B1 | 7/2003 | Anderson et al. |
| 6,601,144 | B1 | 7/2003 | Arimilli et al. |
| 6,631,447 | B1 | 10/2003 | Morioka et al. |
| 6,647,428 | B1 | 11/2003 | Bannai et al. |
| 6,662,305 | B1 | 12/2003 | Salmon et al. |
| 6,735,174 | B1 | 5/2004 | Hefty et al. |
| 6,775,693 | B1 | 8/2004 | Adams |
| 6,799,232 | B1 | 9/2004 | Wang |
| 6,874,054 | B2 | 3/2005 | Clayton et al. |
| 6,880,028 | B2 | 4/2005 | Kurth |
| 6,889,266 | B1 | 5/2005 | Stadler |
| 6,894,978 | B1 | 5/2005 | Hashimoto |
| 6,954,887 | B2 | 10/2005 | Wang et al. |
| 6,986,026 | B2 | 1/2006 | Roth et al. |
| 7,007,123 | B2 | 2/2006 | Golla et al. |
| 7,058,826 | B2 | 6/2006 | Fung |
| 7,065,594 | B2 | 6/2006 | Ripy et al. |
| 7,143,219 | B1 | 11/2006 | Chaudhari et al. |
| 7,191,373 | B2 | 3/2007 | Wang et al. |
| 7,239,565 | B2 | 7/2007 | Liu |
| 7,280,477 | B2 | 10/2007 | Jeffries et al. |
| 7,298,746 | B1 | 11/2007 | De La Iglesia et al. |
| 7,363,629 | B2 | 4/2008 | Springer et al. |
| 7,373,420 | B1 | 5/2008 | Lyon |
| 7,401,245 | B2 | 7/2008 | Fischer et al. |
| 7,454,640 | B1 | 11/2008 | Wong |
| 7,454,641 | B2 | 11/2008 | Connor et al. |
| 7,461,236 | B1 | 12/2008 | Wentzlaff |
| 7,463,529 | B2 | 12/2008 | Matsubara |
| 7,502,474 | B2 | 3/2009 | Kaniz et al. |
| 7,539,845 | B1 | 5/2009 | Wentzlaff et al. |
| 7,613,971 | B2 | 11/2009 | Asaka |
| 7,620,791 | B1 | 11/2009 | Wentzlaff et al. |
| 7,698,581 | B2 | 4/2010 | Oh |
| 2001/0055323 | A1 | 12/2001 | Rowett et al. |
| 2002/0078420 | A1 | 6/2002 | Roth et al. |
| 2002/0087801 | A1 | 7/2002 | Bogin et al. |
| 2002/0100020 | A1 | 7/2002 | Hunter et al. |
| 2002/0129086 | A1 | 9/2002 | Garcia-Luna_Aceves et al. |
| 2002/0138801 | A1 | 9/2002 | Wang et al. |
| 2002/0156979 | A1 | 10/2002 | Rodriguez |
| 2002/0184159 | A1 | 12/2002 | Tadayon et al. |
| 2003/0007457 | A1 | 1/2003 | Farrell et al. |
| 2003/0028749 | A1 | 2/2003 | Ishikawa et al. |
| 2003/0050714 | A1 | 3/2003 | Tymchenko |
| 2003/0050954 | A1* | 3/2003 | Tayyar et al. ............ 709/102 |
| 2003/0074616 | A1 | 4/2003 | Dorsey |
| 2003/0105799 | A1 | 6/2003 | Khan et al. |
| 2003/0163649 | A1 | 8/2003 | Kapur et al. |
| 2003/0177335 | A1 | 9/2003 | Luick |
| 2003/0188053 | A1 | 10/2003 | Tsai |
| 2003/0235202 | A1 | 12/2003 | Van Der Zee et al. |
| 2004/0003184 | A1 | 1/2004 | Safranek et al. |
| 2004/0019730 | A1 | 1/2004 | Walker et al. |
| 2004/0024925 | A1* | 2/2004 | Cypher et al. ............ 710/1 |
| 2004/0073780 | A1 | 4/2004 | Roth et al. |
| 2004/0103218 | A1 | 5/2004 | Blumrich et al. |
| 2004/0210694 | A1 | 10/2004 | Shenderovich |
| 2004/0243739 | A1 | 12/2004 | Spencer |
| 2005/0007986 | A1 | 1/2005 | Malladi et al. |
| 2005/0053057 | A1 | 3/2005 | Deneroff et al. |
| 2005/0076163 | A1 | 4/2005 | Malalur |
| 2005/0160238 | A1 | 7/2005 | Steely et al. |
| 2005/0216613 | A1 | 9/2005 | Ganapathy et al. |
| 2005/0251613 | A1 | 11/2005 | Kissell |
| 2005/0270886 | A1 | 12/2005 | Takashima |
| 2005/0273564 | A1 | 12/2005 | Lakshmanamurthy et al. |
| 2006/0050737 | A1 | 3/2006 | Hsu |
| 2006/0080513 | A1 | 4/2006 | Beukema et al. |
| 2006/0206635 | A1 | 9/2006 | Alexander et al. |
| 2006/0248367 | A1 | 11/2006 | Fischer et al. |
| 2007/0055832 | A1 | 3/2007 | Beat |
| 2007/0133536 | A1 | 6/2007 | Kim et al. |
| 2007/0168803 | A1 | 7/2007 | Wang et al. |
| 2007/0174529 | A1 | 7/2007 | Rodriguez et al. |
| 2007/0195774 | A1 | 8/2007 | Sherman et al. |
| 2008/0147987 | A1 | 6/2008 | Cantin et al. |

OTHER PUBLICATIONS

Definition of "mechanism"; Oxford English Dictionary; OED Third Edition; Jun. 2001; http://www.oed.com/view/Entry/115557?redirectedFrom=mechanism#eid.*

Almasi, et al., "MPI on BlueGene/L: Designing an Efficient General Purpose Messaging Solution for a Large Cellular System," IBM Research Report RC22851 (W037-150) Jul. 22, 2003.

Almasi, et al.,"Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

David Chaiken, Craig Fields, Kiyoshi Kurihara, Anant Agarwal, Directory-Based Cache Coherence in Large-Scale Multiprocessors, Computer, v.23 n.6, p. 49-58, Jun. 1990.

Michel, Dubois, Christoph Scheurich, Faye A. Briggs, Synchronization, Coherence, and Event Ordering in Multiprocessors, Computer, v.21 n.2, p. 9-21, Feb. 1988.

Giampapa, et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, vol. 49, Nos. 2/3, Mar./May 2005 ("Preface").

IBM Journal of Research and Development, Special Double Issue on Blue Gene, vol. 49, Nos. 2/3, Mar./May 2005 ("Intro").

"Intel 870: A Building Block for Cost-Effective, Scalable Servers", Faye Briggs, Michel et al., pp. 36-47, Mar.-Apr. 2002.

Pande, et al., Performance Evaluation and Design Trade-Offs for Network-On-Chip Interconnect Architectures, 2005, IEEE, pp. 1025-1040.

* cited by examiner

METHOD AND APPARATUS FOR EFFICIENTLY TRACKING QUEUE ENTRIES RELATIVE TO A TIMESTAMP

STATEMENT REGARDING FEDERALLY SPONSORED RESEARCH OF DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, co-pending United States patent applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781, for "DMA SHARED BYTE COUNTERS IN A PARALLEL COMPUTER"; U.S. patent application Ser. No 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE REQUEST FOR DEBUGGING A MULTIPROCESSOR"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. patent application Ser. No. 11/768,799, for "METHOD AND APPARATUS FOR GRANTING PROCESSORS ACCESS TO A RESOURCE"; U.S. patent application Ser. No.11/768,572, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A SYSTEM AND METHOD FOR PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUBGROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

BACKGROUND OF THE INVENTION

1. Field of the Invention

The present invention generally relates to computer systems having multiprocessor architectures and, more particularly, to a novel multi-processor computer system for processing memory accesses requests.

2. Description of the Prior Art

To achieve high performance computing, multiple individual processors have been interconnected to form multiprocessor computer systems capable of parallel processing. Multiple processors can be placed on a single chip, or several chips—each containing one or several processors—interconnected into a multiprocessor computer system.

Processors in a multiprocessor computer system use private cache memories because of their short access time (a cache is local to a processor and provides fast access to data) and to reduce the number of memory requests to the main memory. However, managing caches in a multiprocessor system is complex. Multiple private caches introduce the multi-cache coherency problem (or stale data problem) due to multiple copies of main memory data that can concurrently exist in the multiprocessor system.

Small-scale shared memory multiprocessing systems have processors (or groups thereof) interconnected by a single bus. However, with the increasing speed of processors, the feasible number of processors that can share the bus effectively decreases.

The protocols that maintain the coherence between multiple processors are called cache coherence protocols. Cache coherence protocols track any sharing of data blocks between the processors. Depending upon how data sharing is tracked, cache coherence protocols can be grouped into two classes: directory based and snooping.

In a multiprocessor system with coherent cache memory, consistency is maintained by a coherence protocol that generally relies on coherence events sent between caches. A common hardware coherence protocol is based on invalidations. In this protocol, any number of caches can include a read-only line, but these copies must be destroyed when any processor stores to the line. To do this, the cache corresponding to the storing processor sends invalidations to all the other caches before storing the new data into the line. If the caches are write-through, then the store also goes to main memory where all caches can see the new data. Otherwise, a more complicated protocol is required when some other cache reads the line with the new data.

In a cache-coherent multiprocessor system, there may be bursts of activity that cause coherence actions, such as invalidations, to arrive at a cache faster than the cache can process them. In this case, they are generally stored in first-in, first-out (FIFO) queues, thereby absorbing the burst of activity. As known, FIFO queues are a very common structure used in computer systems. They are used to store information that must wait, commonly because the destination of the information is busy. For example, requests to utilize a shared resource often wait in FIFO queues until the resource becomes available. Another example is packet-switched networks, where packets often wait in FIFO queues until a link they need becomes available.

A common operation in a multiprocessor is memory synchronization, which insures that all memory accesses and their related coherence protocol events started before some point in time have completed. For example, memory synchronization can be used before initiating a DMA transfer of data prepared in memory. The synchronization insures that the memory is completely consistent before the DMA transfer begins.

Before a multiprocessor memory synchronization can complete, all coherence protocol events that were initiated prior to the synchronization must be processed. Some of these events could be stored in FIFO queues in the coherence logic of the multiprocessor. One way to make sure all such events have been processed is to drain all of the FIFO queues before completing the memory synchronization. However, this is inefficient because coherence events that arrived after the memory synchronization began are unnecessarily processed, causing a delay in the completion of the synchronization. A second problem with this approach is that processors must be prevented from generating new coherence actions or else the queues will continue to fill, potentially causing a livelock. Stopping all of the processors is necessary for the complete draining approach, but inefficient.

What is needed is a mechanism for tracking queue entries that existed prior to the memory synchronization, and completing the synchronization when those entries have been processed. Ideally, the memory system should be allowed to continue generating new coherence protocol events while the events prior to the synchronization are draining.

It would thus be highly desirable to provide a system and method for tracking queue entries that existed prior to the memory synchronization, and completing the synchronization when those entries have been processed.

Further, it would be desirable to provide a system and method for tracking queue entries wherein the memory system is allowed to continue generating new coherence protocol events while the events prior to the synchronization are draining.

SUMMARY OF THE INVENTION

It is therefore an object of the present invention to provide a novel system and method for tracking coherence event queue entries that existed prior to a memory synchronization operation performed by a processor in a multiprocessor system architecture, and completing the synchronization when those entries have been processed.

It is a further object of the invention to provide a system and method for tracking queue entries wherein the memory system is allowed to continue generating new coherence protocol events while the events prior to the synchronization are draining (i.e., being dequeued).

That is, the present invention teaches an apparatus and method for tracking event signals transmitted by processors in a multiprocessor system. According to a first aspect of the invention, the apparatus comprises a queue structure for storing said event signals transmitted in said system; a logic device associated with a queue structure for controlling enqueuing and dequeuing of received event signals at the structure; and, a counting mechanism for tracking a number of event signals remaining enqueued in the queue structure and dequeued since receipt of a timestamp signal. The counting mechanism generates an output signal indicating that all of the event signals present in the queue structure at the time of receipt of the timestamp signal have been dequeued. This output signal indicates that all events present when the timestamp was asserted have completed.

Further to this embodiment, the logic device generates an enqueue signal for receipt at the queue structure for controlling input of the event signal in the queue structure and a dequeue signal for controlling the dequeuing of coherence event signal from the queue structure.

Further to this embodiment, the counting mechanism includes a first counter device responsive to assertion of said enqueue signal and dequeue signal for counting a number of enqueued event signals in said queue structure.

The counting mechanism is further responsive to receipt of the timestamp signal for receiving a count signal representing the number of enqueued signals in the queue structure, the counting mechanism counting down from the number in response to each dequeue signal asserted when each of the enqueued event signals is dequeued from the queue structure, the counting mechanism generating the output signal when it counts down to zero.

In one additional advantageous embodiment of this invention, flexibility is provided by enabling the counting mechanism to respond to an assertion of a second timestamp signal for tracking a number of events remaining in the queue structure since receipt of a second timestamp signal, issued independently from the assertion of the first timestamp signal.

In the additional advantageous embodiment of this invention, the counter mechanism in response to assertion of said second timestamp signal, receives the count signal representing the number of enqueued signals in the queue structure, and counts down from the number in response to assertion of each dequeue signals asserted when each of the enqueued coherence event signals is dequeued from the queue structure, and further generating a second output signal when it counts down to zero.

In the embodiments described, the multiprocessor system performs a memory synchronization operation, such that this output signal is used as part of a completion condition for a memory synchronization operation in the multiprocessor.

According to a further aspect of the invention, there is provided a method for tracking event signals transmitted in a multiprocessor system, the method comprising:
intercepting an event signal in the multiprocessor system;
enqueuing and dequeuing intercepted the event signals at a queue structure of a plurality of queue structures;
counting a number of event signals enqueued in a respective the queue structure and dequeued from the queue structure since receipt of a timestamp signal, and,
generating an output signal indicating that all of the event signals present in the queue structure at the time of receipt of the timestamp signal have been dequeued.

Further to this aspect of the invention, the method further comprises:
controlling said enqueuing and dequeuing of intercepted said event signals by generating a respective enqueue signal for receipt at said queue structure for controlling input of said intercepted event signal in said queue structure and a dequeue signal for receipt at said queue structure for controlling said dequeuing of said event signal from said queue structure.

Further to this aspect of the invention, wherein counting a number of the coherence event signals enqueued and dequeued from each respective queue structure includes:

implementing a first counter device responsive to assertion of the enqueue signal and dequeue signal for counting a number of enqueued event signals in the queue structure;

implementing a second counter device responsive to receipt of the timestamp signal for receiving a count signal representing the number of enqueued event signals presently in the queue structure; and, counting down from the number in response to assertion of each dequeue signal asserted when removing the enqueued event signal from the queue structure, the second counter device generating the output signal when it counts down to zero.

Further according to this further aspect of the invention, the method comprises:

performing a memory synchronization operation by asserting said timestamp inputs for all queue structures in said system, and then waiting until all output signals are asserted before completing a memory synchronization operation.

Further according to this further aspect of the invention, the method comprises:

counting a number of coherence event signals enqueued in a respective the queue structure and dequeued from the queue structure since receipt of a second timestamp signal, and, responding to assertion of a second timestamp signal for tracking a number of events remaining in the queue structure since receipt of the second timestamp signal.

In each of the embodiments described, the multiprocessor system may further include an arbitration unit responsive to receipt of said generated output signals associated with a respective queue structure for implementing logic to generate an arbitration signal for input to a processor cache.

In each of the embodiments described, the event signals may comprise coherence event signals, and the queue unit is a coherence logic unit associated with each processor of the multiprocessor system. The multiprocessor system may further include one or more snoop filter units associated with each the coherence logic unit that process incoming coherence invalidation events and present a reduced number of coherence events to a processor.

Advantageously, while the invention is described in the context of a microprocessor chip, the invention can be broadly applied to many other digital circuits and systems.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
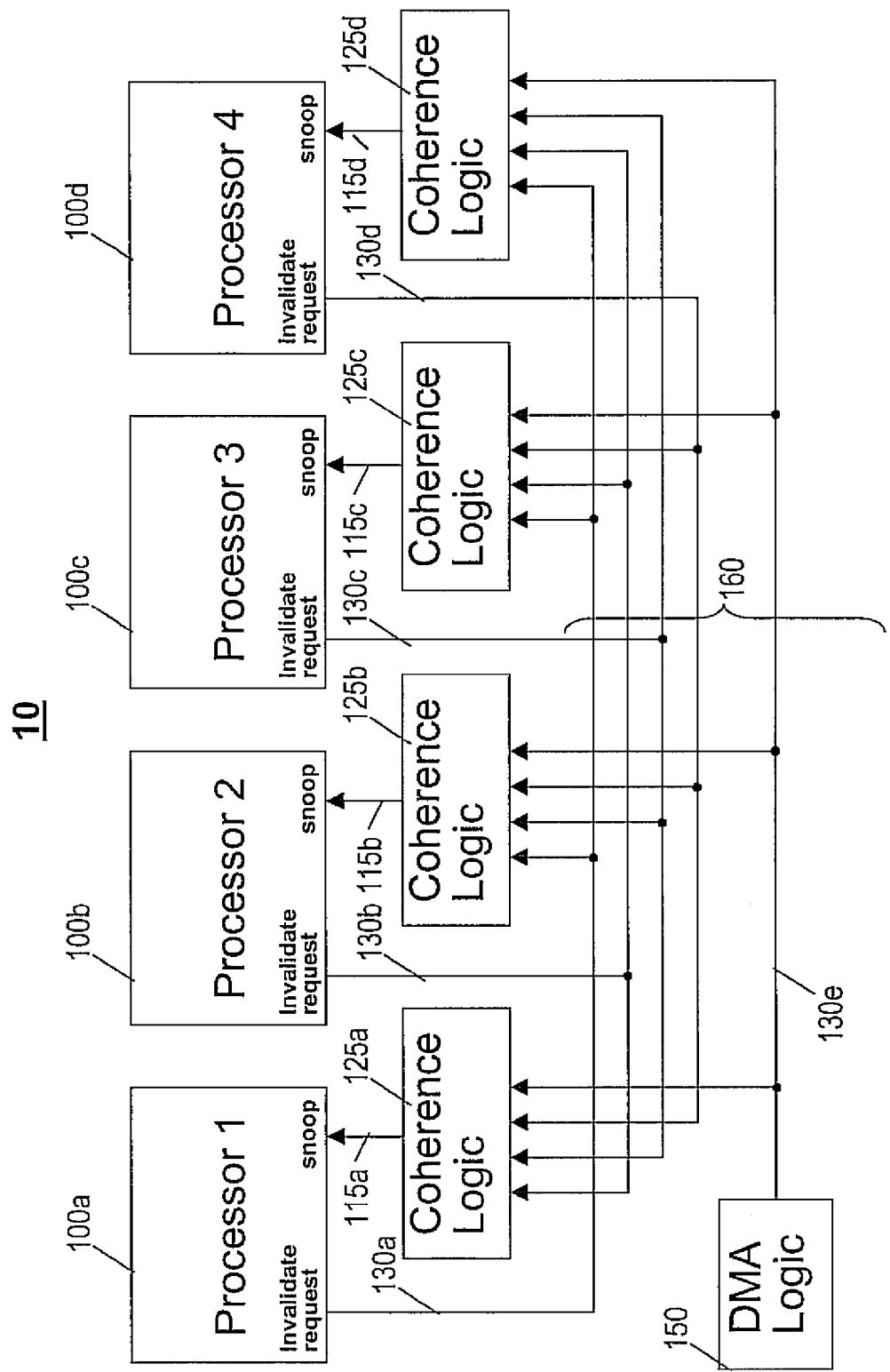
FIG. 1 depicts a coherent multiprocessor system 10 consisting of n-processors (e.g., n=4) in which the present invention may be implemented.

FIG. 1 depicts generally an overall base architecture of a multiprocessor system 10 implementing the method and system for tracking queue entries that existed prior to issuance of a timestamp signal, according to the invention. As shown in FIG. 1, the multiprocessor system 10 is composed of N processors with N=4 (four) processor devices being illustrated, i.e., processors 100a, . . . , 100d. Although not shown, each processor may be equipped with its own local L1 data and instruction caches, and even associated L2 caches (not shown). Further, although not shown in FIG. 1, a main memory may be provided that is shared and can be implemented on-chip or off-chip. In the preferred embodiment, the processor cores 100a, . . . , 100d are identical but any combination of various processors in a single multiprocessor system can be used without departing from the scope of this invention.

In one embodiment, when a processor desires to write new data to a cache line, each processor device 100a, . . . , 100d issues a respective coherence event signal, e.g., invalidate request signal 130a, . . . 130d. These invalidation request signals are broadcast from the respective processors, and particularly their associated caches, to every other processor cache in the system.

Further associated with each processor, as shown in FIG. 1, is a corresponding coherence logic unit 125a, . . . 125d, that intercepts each invalidate request signal 130a, . . . 130d and generates respective snoop signals 115a, . . . , 115d which are input to the cache memory processing unit of the processor. According to one embodiment of the present invention, the coherence logic unit generally implements the coherence protocol algorithms and the modifications according to the present invention. The coherence logic units may comprise a directory table or snoop filter structure implementing snoop filter logic provided for each respective processor core 100a, . . . , 100d such as described in commonly-owned U.S. patent No. 7,386,683, entitled METHOD AND APPARATUS FOR FILTERING SNOOP REQUESTS IN A POINT-TO-POINT INTERCONNECT ARCHITECTURE, the whole contents and disclosure of which is incorporated by reference herein. For transferring coherence event signals, e.g., invalidate request signals 130a, . . . 130d, in one embodiment, a point-to-point interconnection scheme 160 is implemented whereby each processor's associated coherence logic unit is directly connected with each coherence logic unit associated with every other processor in the system. It is understood that other signal coupling architectures may be implemented, e.g., a bus device, to transfer the invalidation request signals between caches associated with the respective processors of the multiprocessor system. Thus, as shown in FIG. 1, invalidate requests 130a, . . . 130d, in particular, are decoupled from all other memory requests transferred via a system local bus, reducing the congestion of that local bus which is often a system bottleneck. All invalidate requests 130a, . . . 130d to a single processor are forwarded to the coherence logic units 125a, . . . 125d. As will be described in greater detail herein, the coherence logic units 125a, . . . 125d processes each invalidate request and implement coherence logic of an n-way multiprocessor in accordance with an invalidation coherence protocol. In the example embodiment depicted in FIG. 1, the invalidation coherence protocol governs a four-way multiprocessor. The Coherence Logic at each processor collects invalidations 130a, . . . 130d, from the respective remote processors 100a, . . . , 100d, and additionally, an invalidation 130e from a direct memory access (DMA) logic unit 150 and forwards them to a processor cache through a respective snoop port, indicated in FIG. 1 as snoop ports associated with snoop signals 115a, . . . , 115d. In the preferred embodiment, one DMA logic unit participates in the coherence protocol of the multiprocessor system. In another embodiment, multiple DMA units for a multitude of network interfaces participate in the coherence protocol.

If the inputs and outputs of the Coherence Logic operate at the same speed, then the Coherence Logic units 125a, . . . 125d can receive invalidation requests at four times the rate they can output them to the processor caches. Therefore, according to the invention, the invalidation requests are stored in queues as shown and described herein with respect to FIG. 2.

Figure 2:
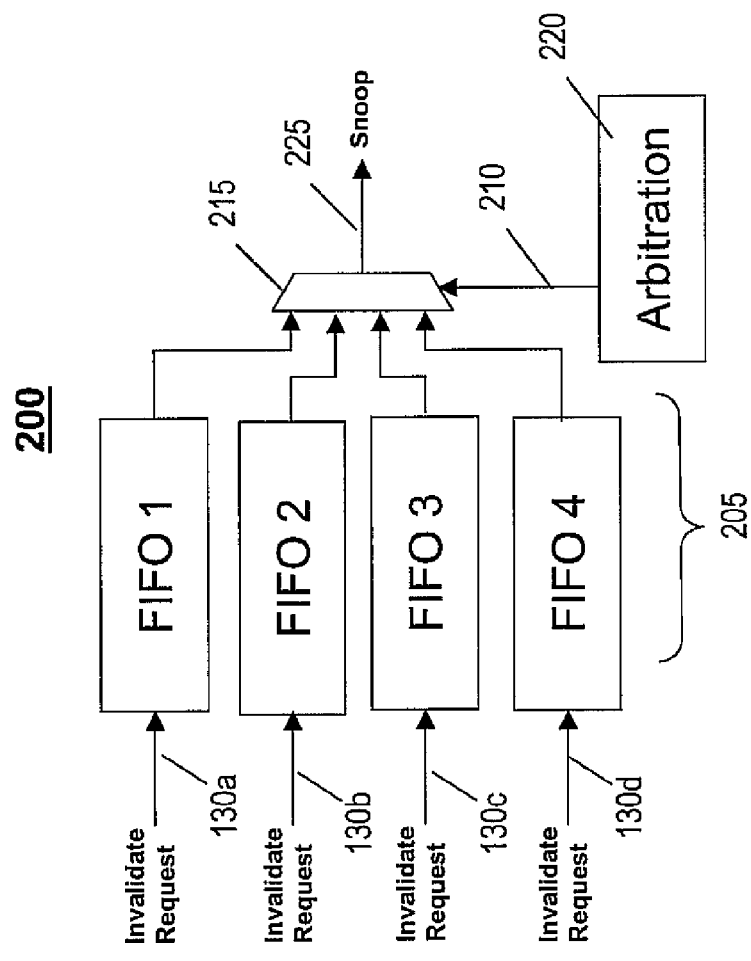
FIG. 2 shows an example structure implementing coherence queuing logic according to the present invention for the system shown in FIG. 1.

FIG. 2 particularly illustrates a first-in-first-out (FIFO) queue structure 200 for storing received invalidation requests at a Coherence Logic unit 125a, . . . 125d. Four parallel FIFO queues 205 enqueue invalidation requests from the various processors in the system 100 and the outputs of the queues 205 are timed according to an arbitration signal 210 controlling a gated device such as multiplexer 215. It is to be understood that the invention is not limited to four queues, but can be applied to any number of queues without departing from the scope of the invention. In the preferred embodiment, the queues store coherence events. In another embodiment, the queues store network packets.

An arbitration unit 220 executes signal processing timed in a manner to control snoop signal requests 225 output from the FIFO queues. Details concerning the operation of the arbitration unit 220 is found in commonly-owned United States patent application Ser. No. 11/768,799 the whole contents and disclosure of which is incorporated by reference as if fully set forth herein. In the preferred embodiment, the queues are emptied (drained) as controlled by the arbiter unit. In another embodiment, there is no arbiter or synchronization circuit to synchronize draining of the queues.

Figure 3:
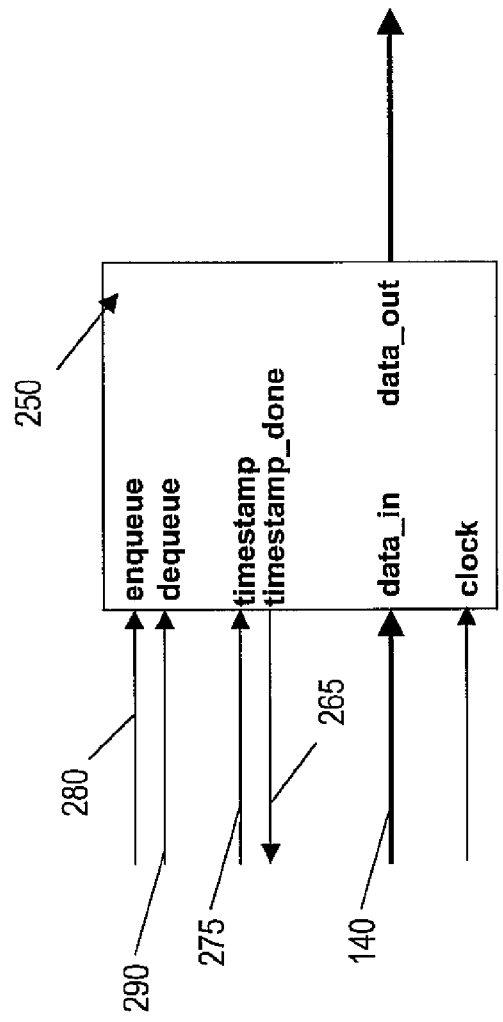
FIG. 3 is a diagram of the timestamp queuing structure interface.

FIG. 3 depicts a diagram of the interface of the timestamp queue 250 of the preferred embodiment, which is preferably implemented in synchronous digital logic circuitry. The timestamp queue receives a timestamp event signal, and allows all entries enqueued prior to a timestamp event to be tagged. The timestamp queue provides a notification when those tagged entries have all been dequeued. New queue entries can be added to the queue during this process of dequeuing of tagged entries. In this manner the system implements efficient memory synchronization.

A coherence event signal (e.g., invalidation request) is enqueued to the tail of the FIFO queue by placing it on the data_in input 140 of the timestamp queue 250 and pulsing the enqueue input 280 synchronous to the clock input. The coherence event at the head of the queue is always available at the data_out output of the queue. The coherence event at the head of the queue is dequeued, or discarded, by pulsing the dequeue input 290 synchronous to the clock signal. When the timestamp input 275 is pulsed synchronous to the clock signal, all queue entries present at that time are tagged. Once the last of those entries has been dequeued, the timestamp_done output 265 asserts. Therefore, a memory synchronization operation can insure that all coherence protocol events have completed by pulsing the timestamp inputs of all the FIFO queues in the system, and then waiting until all of the timestamp_done outputs assert before completing a memory synchronization.

Figure 4:
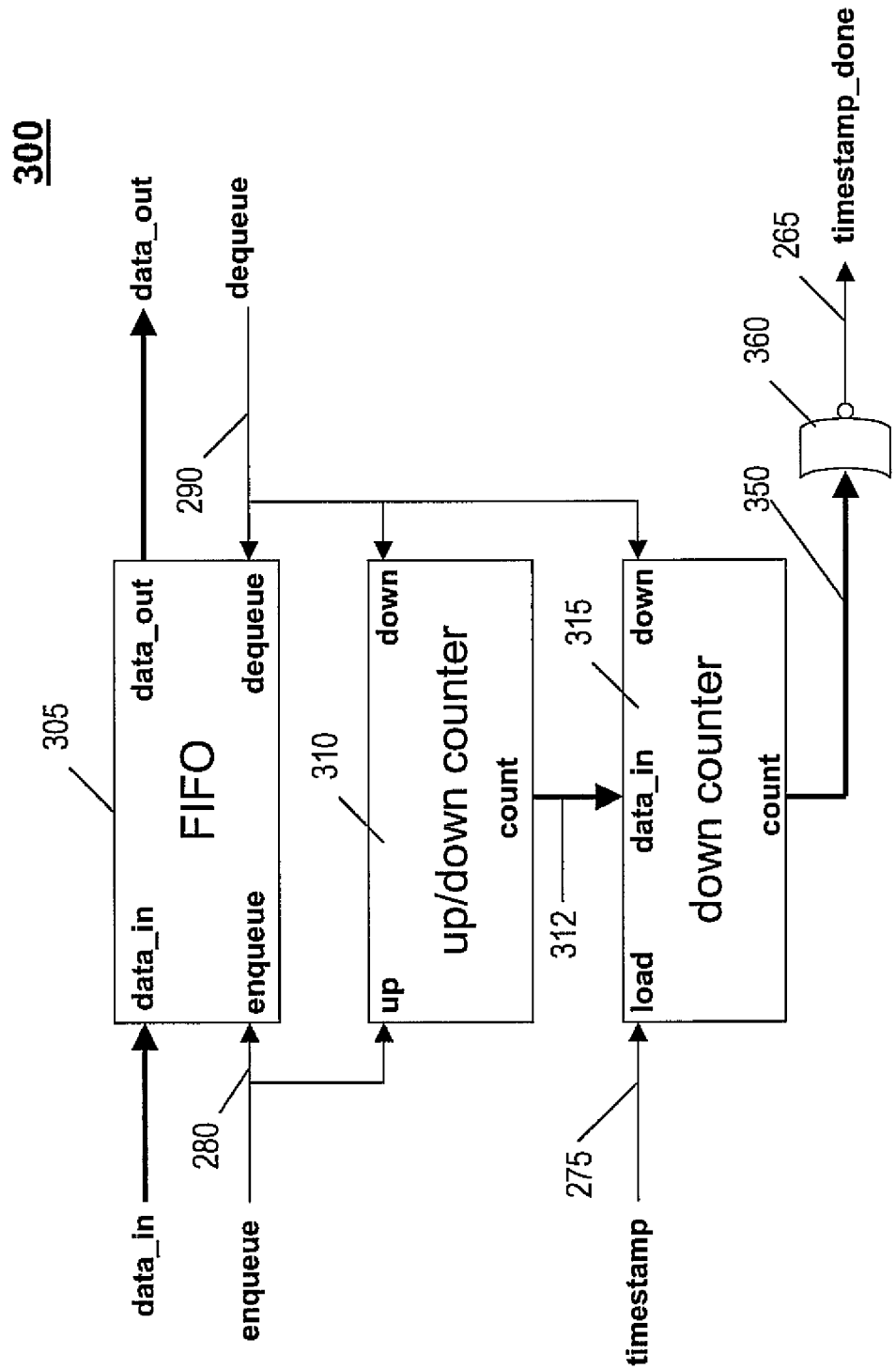
FIG. 4 is a block diagram showing the major components of the timestamp queuing structure.

FIG. 4 depicts a circuit block diagram 300 of an exemplary embodiment of the timestamp queue of FIG. 3. Although not shown, it is assumed that a clock signal is input to the FIFO queue element 305, and up/down counter 310, and down counter 315 components. In the exemplary embodiment of the various components of FIG. 4, the FIFO component stores the coherence events in the standard first-in, first-out manner as described previously herein. That is, a coherence event on the data_in input is stored when the enqueue input 280 is asserted, and the coherence event on the data_out output is discarded when the dequeue input 290 is asserted. Initially, there are no events stored.

The up/down counter in FIG. 4 keeps track of the number of coherence events present in the FIFO 305. Initially, the up/down counter 310 is set to zero. Whenever the enqueue input 280 is asserted, the counter increments by one. Whenever the dequeue input 290 is asserted, the counter 310 decrements by one. The value of the up/down counter 310 is available on its count output signal 312. The down counter 315 is initially set to zero. When the timestamp input 275 is asserted, the down counter 315 is loaded with the current value of the up/down counter 310 through the data_in input. Whenever the dequeue input is asserted, the down counter 315 decrements by one. However, it never decrements below zero. The value of the down counter is available on its count output signal 350.

The NOR gate 360 shown in FIG. 4 represents a logical NOR of the bits comprising the count output 350 of the down counter. Those skilled in the art will recognize that the timestamp_done signal 265 is asserted when the value of the down counter is zero, and not asserted otherwise. Therefore, the timestamp_done signal 265 will assert when the down counter 315 has reached zero, indicating that all of the events present in the FIFO at the time of the assertion of the timestamp input 275 have been dequeued.

In the multiprocessor environment 10 of the preferred embodiment, the timestamp_done outputs of all the timestamp queues can be combined with a logical OR (not shown) to produce a single signal indicating that all coherence events present when timestamp was asserted (i.e. when the memory synchronization began) have completed. This signal can then be used as part of the completion condition for the memory synchronization.

Figure 5:
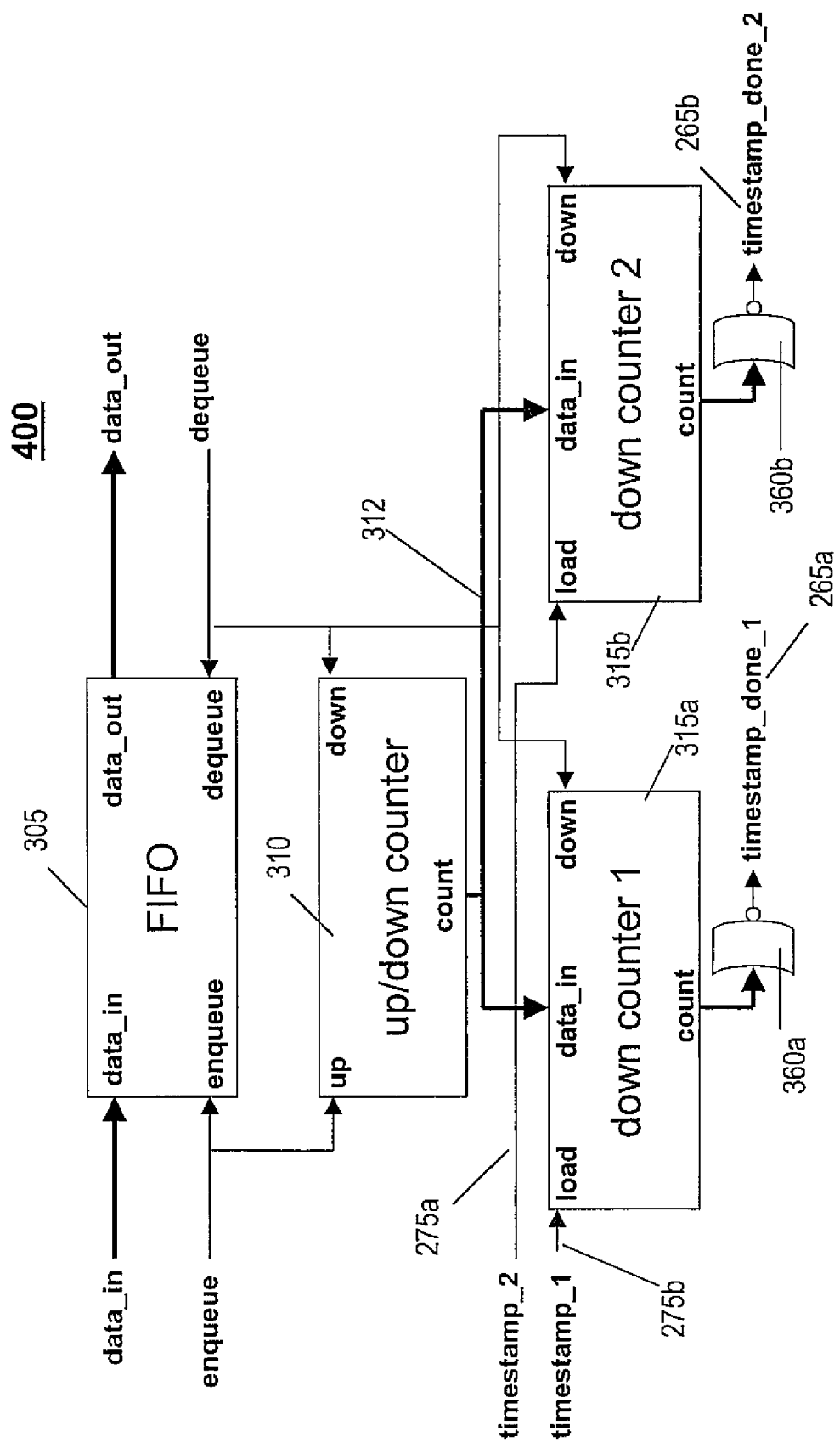
FIG. 5 shows a variation of the timestamp queuing structure that provides two independent timestamps.

The timestamp queue of FIG. 3 could be extended to track two or more timestamps. As shown in FIG. 5, in an example two-timestamp implementation, the timestamp queue 400 structure depicted 400 could support multiple, separate timestamps by adding a separate down counter, e.g., 315a, 315b for each timestamp signal received 275a, 275b, respectively. Each separate down counter 315a, 315b loads the value 312 of the up/down counter 310, but has its own timestamp input, e.g., 275a, 275b, and its own timestamp_done output 265a, 265b. The timestamp_done_1 output 265a indicates that all entries present when timestamp_1 275a was asserted have been dequeued. Similarly, the timestamp_done_2 output 265b indicates that all entries present when timestamp 2 275b was asserted have been dequeued. As in the implementation described herein with respect to FIG. 3, the example two or more timestamp signal variation depicted in FIG. 5 includes two NOR gates 360a and 360b representing a logical NOR of the bits comprising the count output 350a,b of the respective down counter 315a,b. Those skilled in the art will recognize that the timestamp_done signals 265a,b are asserted when the value of their respective down counter is zero, and not asserted otherwise.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. An apparatus for tracking event signals transmitted in a multiprocessor system having a plurality of processor devices, said apparatus comprising:
   a queue structure for storing said event signals transmitted in said system;
   a logic device associated with said queue structure for controlling enqueuing and dequeuing of received said event signals at said structure; and,
   a counting mechanism for tracking a number of event signals remaining enqueued in said queue structure and dequeued since receipt of a timestamp signal, and, said counting mechanism generating an output signal indicating that all of the event signals present in the queue structure at the time of receipt of said timestamp signal have been dequeued.

2. The apparatus as claimed in claim 1, wherein said queue structure is associated with each of said plurality of processor devices in said multiprocessor system 3. The apparatus as claimed in claim 1, wherein said counting mechanism comprises:
   a first counter device responsive to assertion of an enqueue signal and a dequeue signal for counting a number of enqueued event signals in said queue structure; and,
   a second counter device responsive to receipt of said timestamp signal for receiving a count signal representing said number of enqueued event signals in said queue structure, and counting down from said number in response to assertion of each dequeue signal asserted when each said enqueued event signal is dequeued from said queue structure, said second counter device generating said output signal when it counts down to zero.

4. An apparatus as claimed in Claim I, wherein said event signals are coherence event signals, and said queue structure is a coherence logic unit associated with each processor of said multiprocessor system.

5. The apparatus as claimed in claim 4, wherein said coherence event signals are transmitted between memory storage devices associated with each respective processor device of said multiprocessor system via a point-to-point signal communication structure architecture.

6. The apparatus as claimed in claim 4, wherein each processor of said multiprocessor system includes an associated cache device, said coherence event signals being broadcast from an issuing processor cache and transmitted in a multiprocessor system to each other processor cache, a coherence event comprising an invalidation request for invalidating a cache line.

7. The apparatus as claimed in claim 4, wherein a sender of event signals in said multiprocessor system includes a DMA logic device, said system coherence logic unit receiving an invalidate request signal from said DMA.

8. The apparatus as claimed in claim 4, wherein said coherence logic unit further comprises: an arbitration unit responsive to receipt of said generated output signals associated with a respective queue structure for implementing logic to generate an invalidation signal for input to a processor cache.

9. The apparatus as claimed in claim 6, wherein said coherence logic unit further comprises: one or more snoop filter units to process incoming invalidation requests and present a reduced number of invalidation requests to a processor.

10. The apparatus as claimed in claim 4, wherein said multiprocessor system performs a memory synchronization operation, said coherence logic unit ensuring that all coherence events have been completed by asserting said timestamp signal for input to all queue units in said system, and then waiting until all of the said output signals assert before completing a memory synchronization operation.

11. The apparatus as claimed in claim 1, wherein said queue structure is a FIFO structure.

12. The apparatus as claimed in claim 4, wherein said counting mechanism is responsive to assertion of a second timestamp signal for tracking a number of events remaining in said queue structure since receipt of said second timestamp signal.

13. The apparatus as claimed in claim 3, wherein said counting mechanism further comprises:
   an additional second counter device responsive to receipt of said second timestamp signal for receiving said count signal representing said number of enqueued signals in said queue structure, and counting down from said number in response to assertion of each dequeue signal asserted when each said enqueued event signal is dequeued from said queue structure, said additional second counter device generating a further said output signal when it counts down to zero.

14. A method for tracking event signals transmitted in a multiprocessor system, said method comprising:
   intercepting an event signal in said multiprocessor system;
   enqueuing and dequeuing intercepted said event signals at a queue structure;
   counting a number of event signals enqueued in said queue structure and dequeued from said queue structure since receipt of a timestamp signal;
   generating an output signal indicating that all of the event signals present in the queue structure at the time of receipt of the timestamp signal have been dequeued;
   controlling said enqueuing and dequeuing intercepted said event signals by generating a respective enqueue signal for receipt at said queue structure for controlling input of said intercepted event signal in said queue structure and a dequeue signal for receipt at said queue structure for controlling said dequeuing of said event signal from said queue structure, wherein said counting a number of said event signals enqueued and dequeued from said queue structure includes:
   implementing a first counter device responsive to assertion of said enqueue signal and dequeue signal for counting a number of enqueued event signals in said queue structure;
   implementing a second counter device responsive to receipt of said timestamp signal for receiving a count signal representing said number of enqueued event signals presently in said queue structure; and
   counting down from said number in response to assertion of each dequeue signal asserted when removing said enqueued event signal from said queue structure, said second counter device generating said output signal when it counts down to zero.

15. The method as claimed in claim 14, further comprising:
   implementing an additional second counter device responsive to receipt of a second timestamp signal;
   responding to assertion of a second timestamp signal for tracking a number of event signals remaining in said queue structure since receipt of said second timestamp signal;

counting a number of event signals enqueued in a respective said queue structure and dequeued from said queue structure since receipt of a second timestamp signal; and generating second output signal indicating that all of the event signals present in the queue structure at the time of receipt of the second timestamp signal have been dequeued.

16. A queue logic unit for tracking a plurality of event signals in a multiprocessor system, said unit comprising:

a queue structure for storing said coherence event signals transmitted in said system;

a logic device associated with a queue structure for controlling enqueuing and dequeuing of received said event signals at said structure; and, a counter mechanism for tracking a number of event signals remaining enqueued in said queue structure and dequeued since receipt of a timestamp signal, and, said counter mechanism generating an output signal indicating that all of the event signals present in the queue structure at the time of receipt of the timestamp signal have been dequeued.

17. The queue logic unit as claimed in claim 16, wherein said counting mechanism is further responsive to receipt of said timestamp signal for receiving a count signal representing said number of enqueued event signals in said queue structure, and counting down from said number in response to each dequeue signal asserted when each said enqueued signal is dequeued from said queue structure, said counting mechanism generating said output signal when it counts down to zero.

18. A queue logic unit as claimed in claim 16, wherein said event signals are coherence event signals, and said queue unit is a coherence logic unit associated with each processor of said multiprocessor system.

19. The logic unit as claimed in claim 16, wherein said counting mechanism is responsive to assertion of a second timestamp signal for tracking a number of said events remaining in said queue structure since receipt of said second timestamp signal, said counter mechanism receiving said count signal representing said number of enqueued event signals in said queue structure, counting down from said number in response to each dequeue signal asserted when each said enqueued event signal is dequeued from said queue structure, and, generating a further output signal when it counts down to zero.

20. The apparatus as claimed in claim 1, wherein new event signals can be added to the queue during the dequeueing of previously received said event signals.

21. The method as claimed in claim 14, wherein new event signals can be added to the queue during the dequeueing of previously received said event signals.

* * * * *